United States Patent
Wego et al.

(10) Patent No.: US 7,372,862 B2
(45) Date of Patent: May 13, 2008

(54) RATE ADAPTION WITHIN A TDM SWITCH USING BIT STUFFING

(75) Inventors: Arild Wego, Lier (NO); Pal Longva Hellum, Blommenholm (NO)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 731 days.

(21) Appl. No.: 10/497,858

(22) PCT Filed: Dec. 18, 2002

(86) PCT No.: PCT/NO02/00487

§ 371 (c)(1),
(2), (4) Date: Jun. 7, 2004

(87) PCT Pub. No.: WO03/056436

PCT Pub. Date: Jul. 10, 2003

(65) Prior Publication Data

US 2005/0002336 A1 Jan. 6, 2005

(30) Foreign Application Priority Data

Dec. 21, 2001 (NO) .................................. 20016328

(51) Int. Cl.
*H04L 12/28* (2006.01)
(52) U.S. Cl. ........................ 370/412; 370/235; 370/429
(58) Field of Classification Search ................ 370/222, 370/249, 364, 398, 127, 235, 362, 375, 416, 370/412, 429
See application file for complete search history.

(56) References Cited

U.S. PATENT DOCUMENTS

| | | | |
|---|---|---|---|
| 5,208,810 A | 5/1993 | Park | |
| 5,327,430 A * | 7/1994 | Urbansky | 370/465 |
| 5,535,218 A * | 7/1996 | Ng et al. | 370/506 |
| 5,544,324 A | 8/1996 | Edem et al. | |
| 5,644,577 A | 7/1997 | Christensen et al. | |
| 6,054,942 A * | 4/2000 | Stemmler | 341/58 |

(Continued)

OTHER PUBLICATIONS

European Patent Office, International Search Report for PCT/NO02/00487 dated Mar. 11, 2003.

*Primary Examiner*—Ricky Q. Ngo
*Assistant Examiner*—DeWanda Samuel
(74) *Attorney, Agent, or Firm*—Roger S. Burleigh (57) ABSTRACT

The present invention discloses a method and an arrangement providing transmission of data through a node, e.g. a switch, having different input and output line interfaces in a wide range of data speed, without introducing any loss of bits, but still maintaining the nominal bit rate. This is achieved by means of a very simple and flexible implementation. At the receiving side of the switch, one extra bit per frame is transferred over the time slot bus of the switch if the number of bits in the corresponding FIFO of the input line exceeds a predefined upper limit. In contrast, one bit less per frame is transferred if the number of bits in the corresponding FIFO of the input line goes below a predefined lower limit. At the transmitting side of the switch, a FLL circuit regulates the data rate out of the FIFOs. The FLL circuit is implemented as a P-regulator having i.a. the fill degree of the FIFO as a direct input. Consequently, excellent jitter and frequency stability are achieved, and because of not using an I-component, the FLL circuit becomes stable.

15 Claims, 6 Drawing Sheets

U.S. PATENT DOCUMENTS

| | | |
|---|---|---|
| 6,233,250 B1 | 5/2001 | Liu et al. |
| 6,249,756 B1 | 6/2001 | Bunton et al. |
| 6,415,006 B2 * | 7/2002 | Rude .................. 375/372 |
| 6,510,166 B2 * | 1/2003 | McClary ............... 370/505 |
| 6,765,933 B1 * | 7/2004 | Michel et al. .......... 370/539 |
| 6,819,725 B1 * | 11/2004 | Oliver et al. ........... 375/371 |
| 7,149,186 B1 * | 12/2006 | Hey ..................... 370/232 |
| 7,230,917 B1 * | 6/2007 | Fedorkow et al. ...... 370/229 |
| 2001/0016023 A1 * | 8/2001 | Roy et al. .............. 375/372 |
| 2002/0150057 A1 * | 10/2002 | McClary ................ 370/258 |

* cited by examiner

RATE ADAPTION WITHIN A TDM SWITCH USING BIT STUFFING

FIELD OF THE INVENTION

The present invention is related to data nodes in communication networks, in particular to transmitting independent serial data streams through synchronous Time Division Multiplexing (TDM) switches.

BACKGROUND OF THE INVENTION

The lower layer of communication networks like the connectivity layer in a core network of a cellular environment could be seen as a layer of distributed resources for managing data flows. Switches and multiplexers are some of the main components for this purpose. In complex communication networks managing data of different formats and varying data rates, it is of great importance that the construction of the components is flexible without being too complex.

Figure 1:
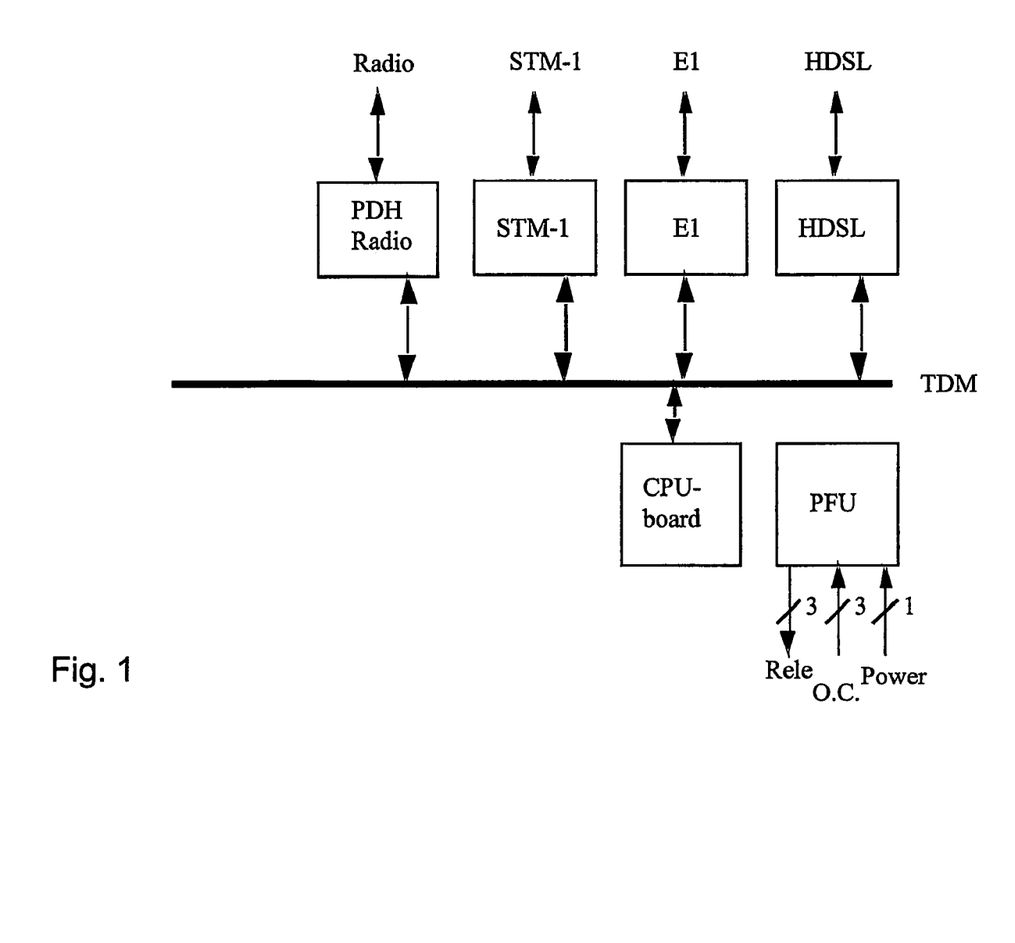
FIG. 1 is a block diagram illustrating an example of serial output/input lines with variable interfaces connected to a TDM bus, e.g. in a switch.

Conventionally, the switches comprise a number of serial inputs and outputs. The data stream of one input may be directed in its entirety to a certain output line, or it may consist of a mixture of time division multiplexed data frames that are to be distributed to several outputs. The different lines may be running various interfaces e.g. E1, E2, E3 and STM-1 (FIG. 1). Additionally, the data speed of each input line may vary in a wide range. The transition of data frames in the switches is often executed by means of time slot buses located on the back plane of the switches.

Figure 2:
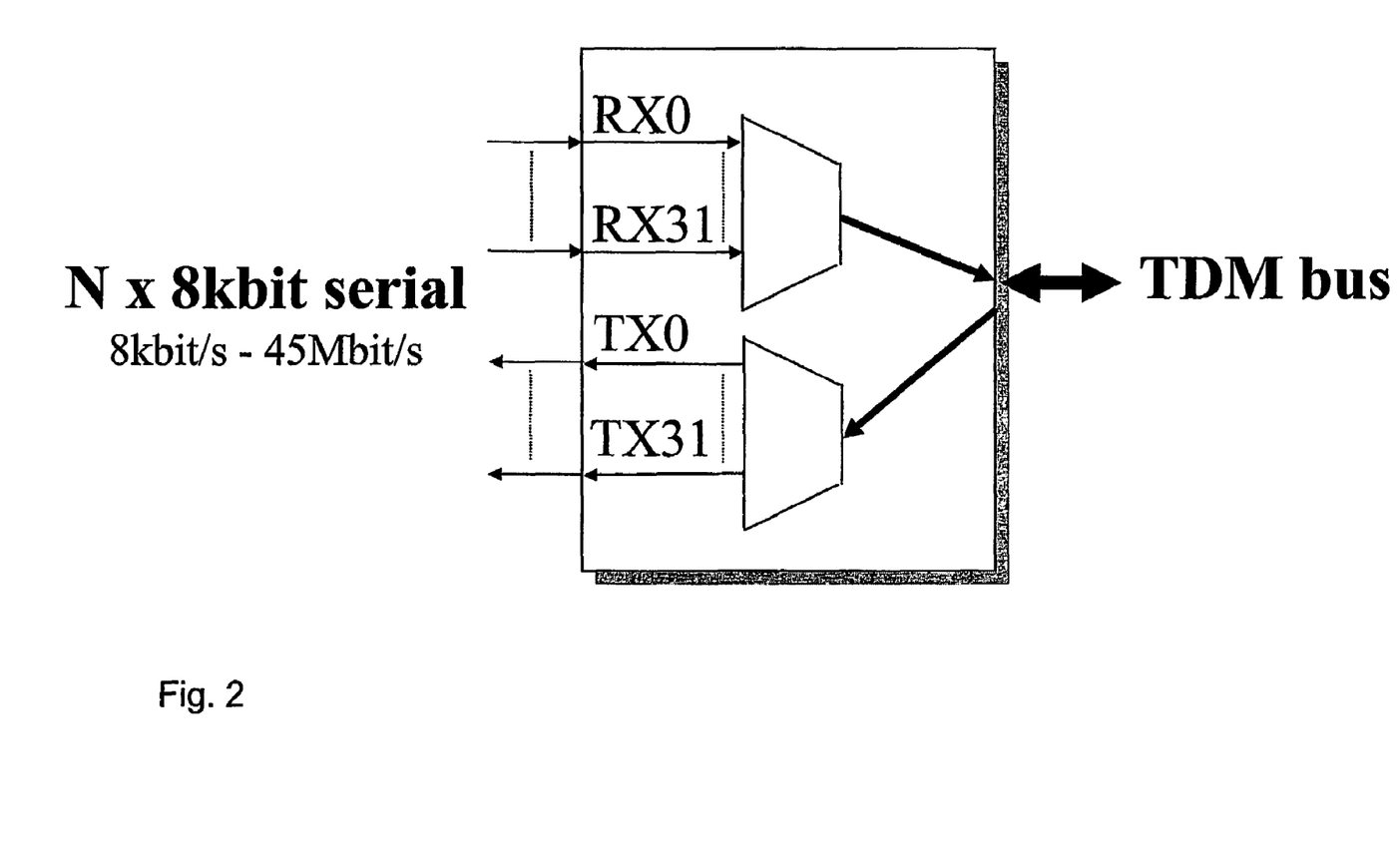
FIG. 2 shows an example switch including its output and input ports and a TDM bus.

A variant of such a switch is illustrated in FIG. 2. In this example switch, there are up to 32 serial input lines and 32 serial output lines. To make the switch flexible and useful for a number of purposes, the possible data speed of each line should vary in a wide range e.g. from 8 kbit/s up to 45 Mbit/s. The transition of data is executed on one or more fast TDM buses, transporting the data frames on time slots preferably with a minimum delay.

To avoid bit slips on bit pipes through the switch, the nominal output bit-rate has to be the same as the nominal input bit-rate. A bit pipe is a serial bit stream (for instance 2 Mbit) coming in at a receiving line, transmitted over the TDM bus and out on a transmitting line (same nominal speed, i.e. 2 Mbit/s). It is not possible to transmit data with the data clocks. This means that the input bit-rate has to be regenerated on the output.

Since the receiving lines are independent in relation to data speed and timing, it is also a challenge to transmit data on the same data bus without introducing data and timing faults. At the same time, the memory requirements due to speed inconsistency should not be unreasonable high.

Also, requirements on maximum tolerable input jitter, jitter attenuation and maximum intrinsic jitter have to be met.

Regenerating the input bit rate on the output may be done by introducing a FIFO-FLL solution. FIFO (First In First Out) fill degree limits are defined, and the FLL then tries to lock the output frequency so that the FIFO fill degree is between an upper and lower limit or as close as possible to an ideal limit.

Figure 3:
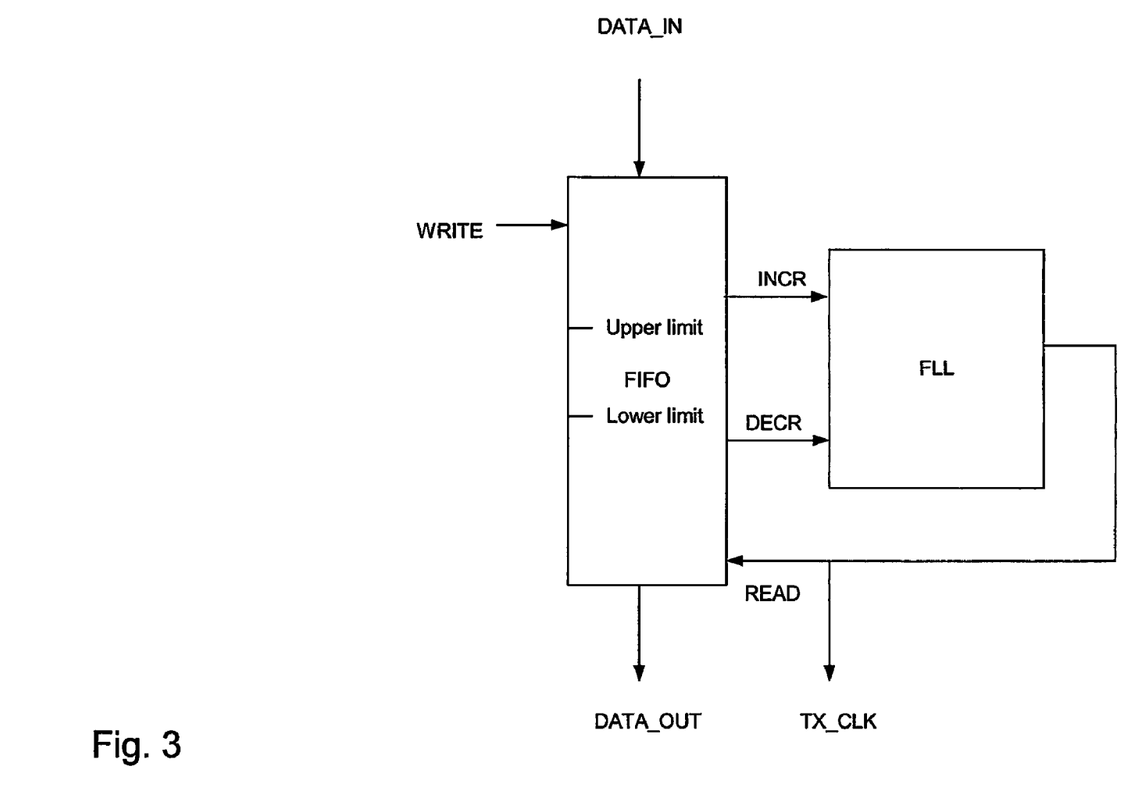
FIG. 3 shows a FIFO-FLL connection of the state of the art.

In FIG. 3, DATA_IN is latched/clocked into the FIFO by the signal WRITE. Data is read out of the FIFO (DATA_OUT) by the signal READ coming from the FLL. TX_CLK is the output (transmit) data clock and will be in phase with DATA_OUT. An example of such a solution may be seen in [2].

When the FIFO fill degree goes above the "upper limit" defined, the signal INCR indicates to the FLL that the output frequency has to be increased. When the FIFO fill degree goes below the "lower limit", the signal DECR indicates to the FLL that the output frequency has to be decreased. The FLL may be implemented as a PI-regulator.

A lot of other solutions using the FIFO fill degree for regenerating a transmit data clock exist. The following patents include such solutions.

U.S. Pat. No. 5,708,686
U.S. Pat. No. 5,898,744
U.S. Pat. No. 6,172,964
Canadian patent CA-2019649 A Problems with Known Solutions An I-component has to be implemented in the regulator to achieve more regulation the longer the FIFO fill degree is outside the limits. A P-component has to be implemented to make the regulator stable. The disadvantages with such a PI-regulator are:

The I-component can make the FLL unstable. The higher the I-component is related to the P component, the more unstable the regulator becomes.

The I-component makes the FLL slow. To get the FLL locked often takes several seconds when the jitter attenuation requirements shall be met.

Complicated logic for making the in-lock time shorter may be necessary.

Jitter attenuation requirements limit the size of the P-component.

Intrinsic jitter is introduced by both the I-component and the P-component, but mostly by the I-component.

The main drawbacks with the inventions described in the U.S. and Canadian patents mentioned above are related to the frequency generation and to the phase error modulation onto a nominal frequency.

U.S. Pat. No. 5,708,686 uses voltage-controlled oscillators to cover a large frequency range. The output clock is generated by a frequency divider and not a frequency multiplier, a half full signal is needed and the readout-clock must have a lower frequency than the receive clock.

U.S. Pat. No. 5,898,744 uses a numerically controlled oscillator to generate the output clock. The number of output frequencies is then very limited. In the detailed description of the figures, only two frequencies may be generated (line 6-15).

In U.S. Pat. No. 6,172,964, a device to control a mark-space ratio is necessary. The way the output frequency is generated in claim means that it is generated by a frequency divider, as described at line 4-3 to 4-8, and not a frequency multiplier. This leads to short frequency jumps to frequencies that differ relatively much from the nominal frequency (example of 651 ppm as described at line 4-17). Such frequency jumps introduce wander in the system. The way to minimize jitter explained in line 3-53 to 3-56 really just pulls the jitter down in the frequency domain and instead introduces a lot of wander. This is a problem since wander is more difficult to attenuate than jitter. This invention is preferably used in an ATM network and not in a TDM system (line 2-34).

In Canadian patent CA-2019649 A, the concept with the FIFO-FLL solution is used as part of a more comprehensive invention, but the details of how the frequency locked loop are implemented are not described.

The FIFO solutions require that some timing and fault information is transmitted together with the data from the receiving to the transmitting side, and a certain frame structure must be used.

In this context, Canadian patent CA-2019649 A uses multi-frame. Time variance compensating information is transferred in a side channel located in some fixed bit positions in the multiframe. This is best suited for low bit rates (below 64 kbit/s) and over a low speed TDM bus (i.e. 2 Mbit/s).

Besides, the side channel for transferring timing information has a fixed bandwidth, and the multiframe structure is quite complicated.

Because of the multiframe structure, timing information can not be updated for each frame.

The way the RX FIFO-Digital FLL solution uses threshold values to control the rate of the output clock does not give optimal jitter and stability characteristics on the output frequency.

Generally, problems with the known way of signalling timing faults described in the chapter above is that since the CPU must be involved, the action may be relatively long lasting and some of the CPU capacities become occupied.

SUMMARY OF THE INVENTION

It is an object of the present invention to provide an arrangement that eliminates the drawbacks described above. The features defined in the claims enclosed characterize this method.

In particular, the present invention discloses a method and an arrangement providing transmission of data through a node, e.g. a switch. At the receiving side of the switch, one extra bit per frame is transferred over the time slot bus of the switch if the number of bits in the corresponding FIFO of the input line exceeds a predefined upper limit. In contrast, one bit less per frame is transferred if the number of bits in the corresponding FIFO of the input line goes below a predefined lower limit. At the transmitting side of the switch, a FLL circuit regulates the data rate out of the FIFOs. The FLL circuit is implemented as a P-regulator having i.a. the fill degree of the is FIFO as a direct input. The present invention prevents introduction of bit loss, still maintaining the nominal bit rate in spite of a very simple and flexible implementation. The FLL circuit provides excellent jitter and frequency stability, and because of not using an I-component, the FLL circuit becomes stable.

BRIEF DESCRIPTION OF THE DRAWINGS

In order to make the invention more readily understandable, the discussion that follows will refer to the accompanying drawings.

DETAILED DESCRIPTION OF THE PREFERRED EMBODIMENTS

In order to achieve bit transparent pipes with independent timing, the present invention proposes a method inserting a certain header in each frame before transmission on the TDM bus. Also according to the present invention, a FIFO for each output port at the transmitting side of the switch is regulated with inventive regulation circuits.

At the receiving side of the switch there is a FIFO for each input port with a programmable depth, e.g. 64 bits, and the serial data of the input lines is clocked into the FIFOs. An example of such FIFO can be, seen in FIG. 4. As it can be seen from FIG. 4, the FIFO depth may be less than the actual physical size. It should be possible to reset the FIFO pointer to a mid-position. This is preferably done automatically when there is an overflow or underflow error in the FIFO, or the software programmer can do it at any time.

Figure 4:
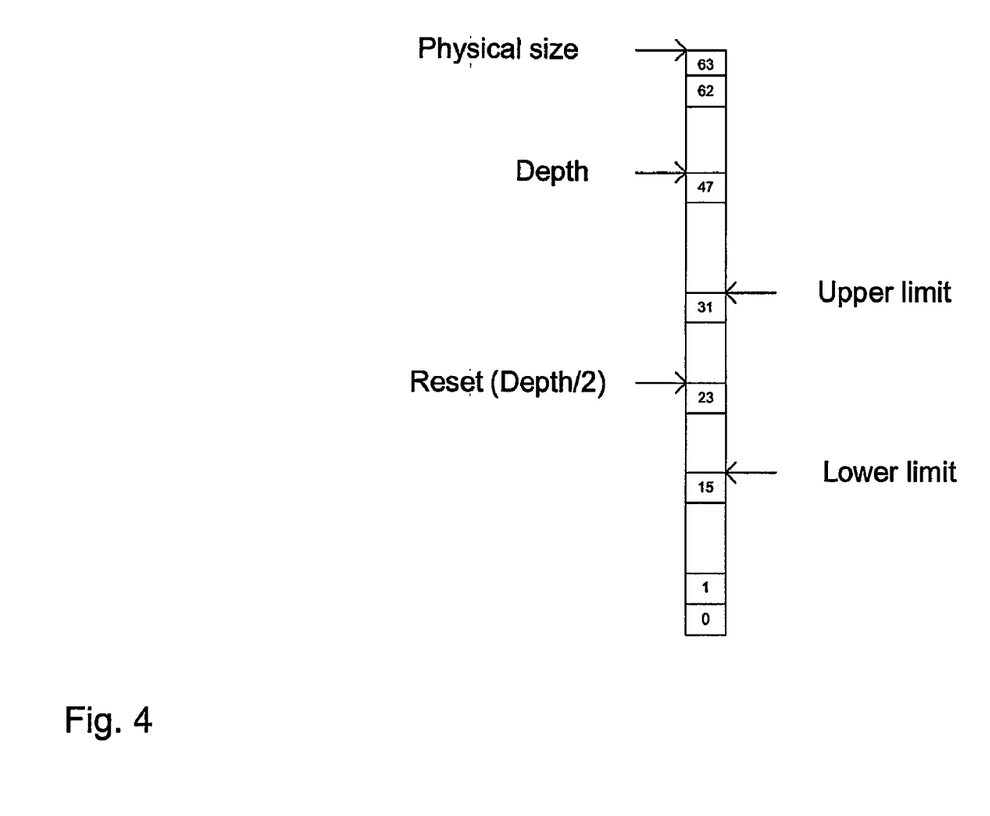
FIG. 4 illustrates an example of a FIFO structure.

The abovementioned header is, i.a., used for bit stuffing. Bit stuffing in this context is used to compensate for small frequency variations in the incoming data stream. The indicated upper and lower limits of the input FIFO determine when this bit stuffing shall occur. These limits are stored in registers programmable from a processor interface. If the FIFO fill degree (number of bits in the FIFO) exceeds the upper limit, then one extra bit in the header will be used for transferring data. If the level in the FIFO goes below the lower limit, one bit less is transmitted in the next frame on the bus, i.e. the first byte after the header will contain a bit that is not valid in bit position 0, and the data rate is reduced by one bit per frame. If the FIFO gets full or empty, an error shall be reported to the processor.

Figure 5:
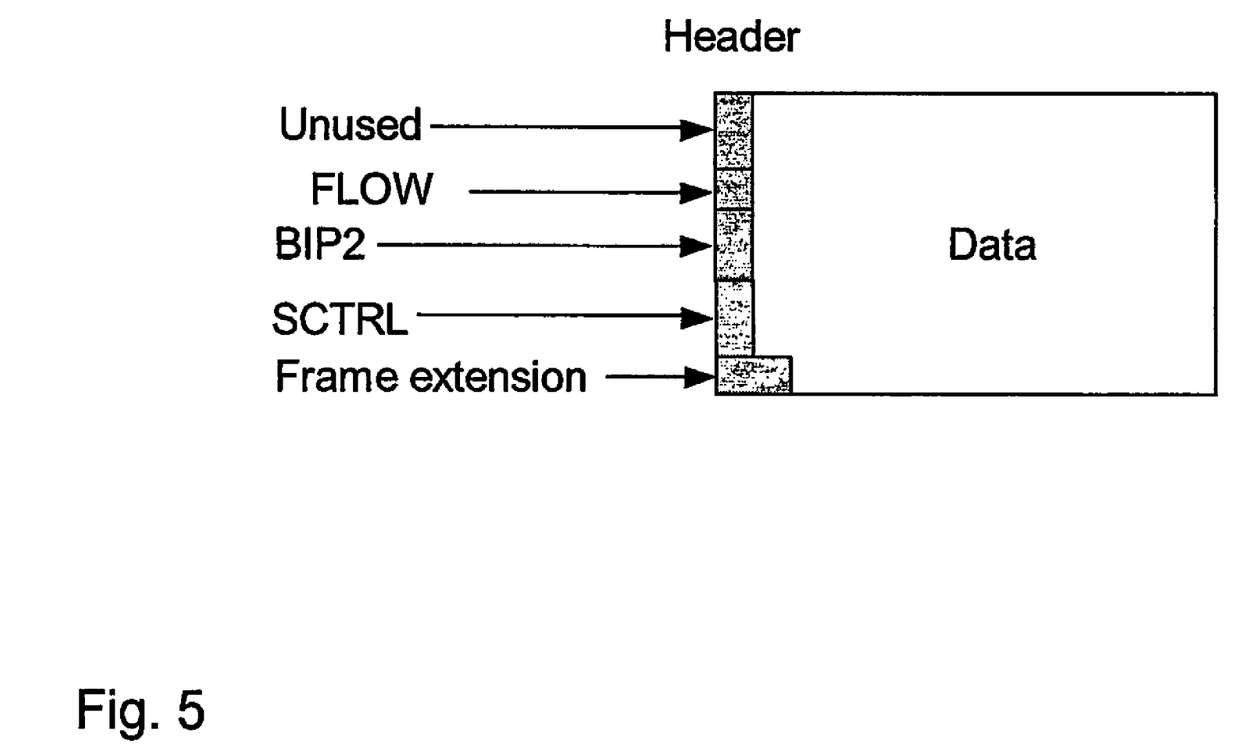
FIG. 5 illustrates a frame format according to an embodiment of the present invention.

A preferred header of the present invention is shown in FIG. 5. The first field is set to be unused, but the second field, designated "FLOW", is used to store information if the RX FIFO has had an overflow or underflow (bit called FLOW) during the last TDM frame. The FLOW bit may then be read in the transmit module (TX module), and in this way the TX module may immediately see if there has been timing faults at the RX side. If the FLOW bit is set, it will be known that the data rate and also the data itself may be corrupted, and thus a nominal bit rate is sent out on the transmit line instead of a corrupted regenerated RX bit rate. AIS (ones only, which is an idle timeslot pattern) may be advantageous to transmit on the TX line instead of corrupted data.

In the header, there is preferably also a field called BIP2 ("Bit Interleaved Parity"). This field contains 2 bits used for sending parity information from the receive side to the transmit side. One of the bits holds the parity for odd bit positions in the serial bit stream, while the other bit holds parity for even bit positions. Note that parity is for data bits only, and is deduced from the previous frame. Odd parity is implemented. The BIP2 may by used by the system to observe that something is wrong on the bit pipe from the receive side to the transmit side.

The SCTRL bits are used for the abovementioned bit stuffing to either increase or decrease the number of data bits transferred during one frame. It is possible to use one bit in the header for data, or reduce the number of valid data bits in the first byte after the header, also called the granularity byte. The granularity byte consists of 1 to 8 valid bits, and makes it possible to configure data rates that are 8 kbit multiples. The data bit rates are configured in control registers accessed by a CPU control interface.

Figure 6:
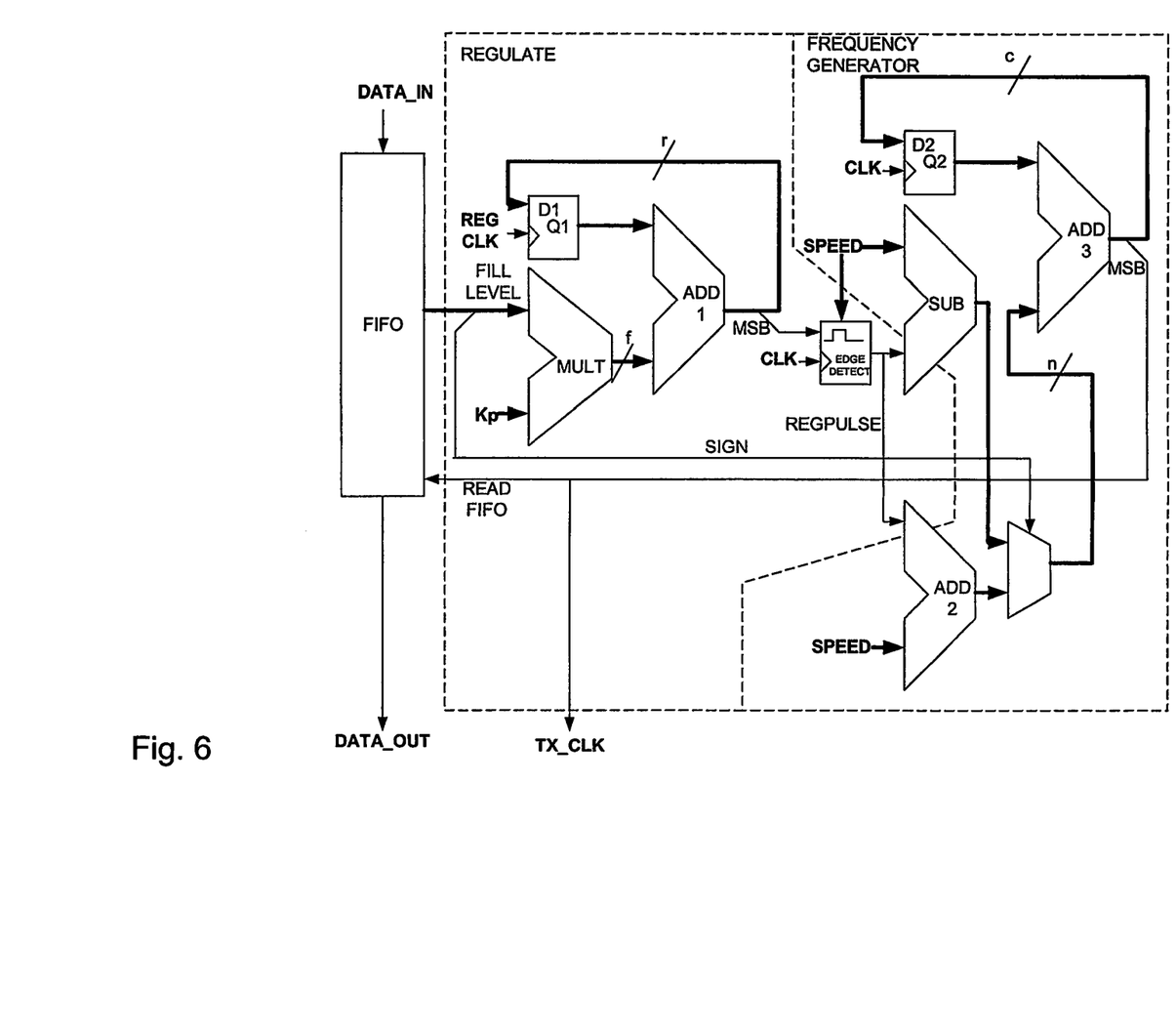
FIG. 6 is a block diagram illustrating a FIFO-FLL implementation according to an embodiment of the present invention.

At the transmitting side of the TDM bus, the header is removed and the frames are handed over to the FIFOs of their respective output lines. According to the present invention, each FIFO is regulated by a FLL implemented as a P-regulator for achieving the same nominal bit rate at the receiving side as for the transmitting side. One example of how the P-regulator may be implemented is shown in FIG. 6.

Instead of using the signals INCR and DECR in FIG. 3, the FIFO fill degree is used directly as input to the FLL.

One part of the FLL takes care of the regulation and the second part takes care of the frequency generation. Input to the regulate block is the signals FILL_LEVEL, Kp, CLK and REG_CLK. Output from the block is the signal REG-_PULSE.

FILL_LEVEL indicates the FIFO fill degree. This signal is represented in a signed magnitude representation that means that the first bit represents the SIGN (+/−) and the last bits represent the amplitude (only the amplitude of FILL_LEVEL is input to the multiplicator). The amplitude shows how close the FIFO fill degree is to a half full FIFO, and the sign bit indicates if the fill degree is above or below a half full level. If the FIFO is half full, then the distance between the read pointer and the write pointer is DEPTH/2 where DEPTH is the programmed size of the FIFO. A FIFO read_pointer and write_pointer is used to indicate from which FIFO positions input data shall be written to and output data shall be read from. The fill level may then be represented by the formula:

FILL_LEVEL=(write_pointer−read_pointer)−DEPTH/2 if write_pointer>read_pointer and FILL_LEVEL=(DEPTH+write_pointer−read-_pointer)−DEPTH/2 if read_pointer>write_pointer.

This means that:

For a full FIFO, FILL_LEVEL=+DEPTH/2, for an empty FIFO, FILL_LEVEL=−DEPTH/2, for a half full FIFO, FILL_LEVEL=0.

Kp indicates the proportionality constant and indicates how much the FILL_LEVEL amplitude shall be attenuated. Kp is a programmable register that may for instance be accessed from a CPU interface. The value of this register should be tuned to find the desired jitter characteristic and the desired output frequency range. A big Kp gives a bigger output frequency range (in ppm) and makes the FLL track the incoming frequency faster than with a low Kp. Output jitter is less and jitter attenuation is better the lower the Kp is.

REGCLK is a clock that is phase locked to TX_CLK, but the frequencies are not the same. The frequency of the clock should be dimensioned to get the desired characteristics of the system (see below).

CLK is a free running system clock that must have a frequency that can be directly divided by a power of two down to the granularity frequency of the system. If the granularity frequency is 8000 Hz, then any output frequencies that are multiples of 8000 Hz may be generated by the FLL. CLK must then have a frequency that is a power of two multiplied with 8000 Hz (for example 16384×8000=131.072 MHz).

REGPULSE is a one-bit signal indicating each time the period of TX_CLK shall be regulated with the one system clock period (CLK). The frequency of this signal is directly proportional to Kp×FIFO_LEVEL and the length of each pulse shall be SPEED×CLK periods.

Input to the frequency generator block is the signals SPEED, CLK and REGPULSE. Output signal is the regulated output data clock TX_CLK (or READ_FIFO).

SPEED indicates the required nominal data rate out from the FIFO. The number is given as an integer value multiplied by the granularity frequency. A granularity frequency of 8 kHz and SPEED of 256, gives an output data rate of 256×8 kHz=2.048 MHz.

TX_CLK (READ_FIFO) is the output regulated data rate from the FLL.

The part of the P-regulator called REGULATE may be considered as a phase-to-frequency converter generating a frequency (REGPULSE) proportional to the fill level of the FIFO by integrating the phase of FILL_LEVEL. The proportionality degree is determined by the abovementioned Kp.

The logic following REGULATE called FREQUENCY GENERATOR generates a pulse signal having a deviation related to the desired nominal frequency (SPEED) being proportional to the fill level of the FIFO. By using this pulse signal as an output reading pulse for the FIFO, the nominal output bit rate will be the same as for the nominal input bit rate without any bit slipping through the switch.

Dimensioning of the bus widths r and f is done by the following equations:

$$f = \text{bus width}(\text{FILL\_LEVEL}(\text{amplitude})) + \text{bus width}(Kp)$$

$$r \geq f+1$$

and $$r \leq (REGCLK/CLK) \times (f/MAXDEV) \times 10^6$$

where MAXDEV is the PPM deviation of the incoming DataStream that leads to maximum/minimum FIFO fill at maximum Kp.

Now assume a 64 bit FIFO. The bus width FILL_LEVEL(amplitude) is LOG2 (DEPTH/2)=5. (FILL_LEVEL is then 6 bit including the sign bit). Kp may be selected to, e.g., 8 bit which gives a reasonably good flexibility. Kp is a positive value without any sign bit. f then becomes 5+8=13 bit Assume also a regulation frequency REGCLK=8 kHz and a requirement that MAXDEV shall be 200 ppm. The system clock (CLK) is 131.072 MHz. By using the second equation for calculating, the minimum r value gives:

$$r < (8.000/131.072.000) \times (13/200) \times 10^6$$

$$r < 3.97$$

The equation r<3.97 is not compliant with, i.e., r>=f+1 and therefore, one of the input parameters has to be changed. REGCLK is the parameter that has the least influence on the rest of the system. Increasing the REGCLK frequency to 32 kHz gives:

$$r < (32.000/131.072.000) \times (13/200) \times 10^6$$

$$r < 15.86$$

The equation r<15.86 is compliant with r>=f+1
We could then chose r=14 (or r=15).
The dimensioning of n and c should be done as follows:
n is the bus width of the SPEED signal. With a maximum required TX_CLK frequency of 45 MHz and a granularity frequency of 8 kHz:

$$n = LOG2(45.000/8) = 13 \text{ rounded up to nearest integer}$$

$c <= n+1$

The maximum nominal frequency that can be generated is TX_CLKmax=(CLK/2)−(2×granularity frequency). This frequency can be generated when c=n+1. If c>n+1 the maximum nominal frequency is reduced. The granularity frequency is given by the formula CLK/(2ĉ).

With CLK=131,072 MHz and a granularity frequency of 8 kHz, we get c=14.

The main advantage of the present invention is that it provides transmission of data through a node having different line interfaces without any loss of bits, still maintaining the nominal bit rate. In fact, any bit rates ranging from as low as 8 kbit/s and up to at least 45 Mbit/s with a granularity of 8 kbit/s can be transmitted. This is achieved according to the present invention in spite of a relative simple implementation.

As the output clock is generated from a frequency multiplier, and not a frequency divider, it will be possible to generate all multiples of N×gran kbit, where N is an integer number and gran is the granularity frequency.

Very small frequency variations can be realized because of the way the phase error from the FIFO is modulated into the nominal frequency generator.

Minimum intrinsic jitter is generated because of the p-regulator structure.

Only P-component is needed in the FLL, thus it is stable because the I-component is eliminated.

Programmable P-coefficients can easily be programmed to get the most optimal jitter characteristics (jitter attenuation/intrinsic jitter). The jitter introduced by the bit stuffing is easy to control/attenuate.

Regulation resolution is less than one system clock period.

Each frame can vary maximum +/− 1 bit compared with a nominal bit rate and not a whole timeslot.

Timing variation information is updated and transmitted from receive to transmit side every frame (ref [2]).

Jitter and frequency stability characteristics are very good by using the FIFO-FLL concept described in [3].

Timing faults on the receive side can be identified on the transmit side after only one frame by observing the header.

Parity check supervision (BIP2) end to end can be made in each frame.

Actions like sending nominal transmit clock rate and sending AIS on the transmit side when timing faults are observed may be done immediately without involving the CPU system.

The CPU capacity is not affected.

Further, the bit stuffing method combined with the precise FIFO fill degree P-regulation allows for a reduction of the FIFO size.

References & Abbreviation

| | |
|---|---|
| FIFO | First In First Out |
| FLL | Frequency Locked Loop |
| LINE | Serial data lines, i.e. E1, STM-1 etc. |
| RX | Receive direction |
| STM-1 | Synchronous Transfer Mode |
| TDM | Time Division Multiplexing |
| TX | Transmit direction |
| BIP2 | Bit Interleaved Parity - 2 bit |
| [1] | U.S. Pat. No. 5,544,324; Network for transmitting synchronous-source data using a frame structure with a variable number of time slots to compensate for timing variance between reference clock and data rate. |
| [2] | Canadian patent CA-2019649 A |
| [3] | ETO/I/ND/A; Method for regeneration of the data rate of a bit pipe through a TDM |
| [4] | U.S. Pat. No. 5,708,686 |
| [5] | U.S. Pat. No. 5,898,744 |
| [6] | U.S. Pat. No. 6,172,964 |

The invention claimed is:

1. A method for rate adaptation applied to a node in a communication network, said node comprising one or more time slot buses transferring frames from a number of serial input lines located on a receiving side of the node to a number of serial output lines located on the transmitting side of the node, the serial input/output lines each having one respective FIFO into/from which bits corresponding to the associated serial line are shifted, said method comprising the steps of:
  a) transferring one extra bit per frame from a FIFO of an input line if the number of bits in the FIFO exceeds a predefined upper limit;
  b) transferring one bit less per frame from a FIFO of an input line if the number of bits in the FIFO goes below a predefined lower limit; and
  c) inserting one header to each frame comprising at least a control and an extension field, the control field indicating if the respective frame includes one extra bit or one bit less, and the extension field is reserved for the possible extra bit.

2. The method according to claim 1, wherein step b) is executed by reducing the number of valid bits in the byte following the header with one.

3. The method according to claim 1, wherein the header further comprises a flow field indicating if the corresponding FIFO at the receiving side during the previous transmitted frame had an overflow or an underflow.

4. The method according to claim 1, wherein the header further comprises a parity field indicating the parity for odd and/or even bit positions in the bit stream of the corresponding serial bit stream.

5. The method according to claim 1, wherein the number of valid bits in the byte following the header may vary from 1 to 8 in order to adjust the data rate to 8 kbit multiples.

6. The method according to claim 1, wherein the physical size of the FIFOs are 64 bits.

7. The method according to claim 1, wherein said node is a switch.

8. A system for rate adaptation in a node of a communication network, said node comprising one or more time slot buses transferring frames from a number of serial input lines located on a receiving side of the node to a number of serial output lines located on the transmitting side of the node, the serial input/output lines each having one respective FIFO into/from which bits corresponding to the associated serial line are shifted, a FIFO of an output line is clocked out with a clock signal controlled by a respective Frequency Locked Loop (FLL) circuit, wherein:
  said FLL comprises a phase-to-frequency converter and a frequency generator, wherein said converter is adapted to generate an internal pulse signal with a frequency proportional to a fill level of the FIFO relative to half a predefined maximum allowed size of the FIFO, the internal pulse signal is generated by an edge detector that is edge detecting the output of the converter and regulating the pulse length of the internal pulse signal is the required nominal data rate multiplied with the period of a system clock, and wherein the generator is adapted to generate, on basis of the internal pulse signal and a required nominal data rate out of the FIFO, said clock signal with a deviation from the required nominal data rate that is proportional to said fill level.

9. The system according to claim 8, wherein the proportionality of the frequency of the internal pulse signal to the fill level is determined by a proportionality constant (Kp) being input to the converter together with the fill level.

10. The system according to claim 8, wherein the fill level is represented in a signed magnitude expressing the deviation from half the predefined maximum allowed size of the FIFO, a positive fill level means that the number of bits in the FIFO is more than half maximum allowed size, and a negative fill level means that the number of bits in the FIFO is less than half the maximum allowed size.

11. The system according to claim 9, wherein the phase-to-frequency converter comprises a multiplier, a first adder and a first number of flip-flops, the multiplier having the fill level and the proportionality constant as inputs, and the first adder having the output of the multiplier and its own output, which is the output of the converter, looped back through the first flip-flops as inputs.

12. The system according to claim 11, wherein the first flip-flops are clocked by a regulation clock pulse being phase locked to said clock signal.

13. The system according to claim 8, wherein the frequency generator comprises a subtractor, a second and a third adder, a multiplexer and a second number of flip-flops, the subtractor having a required nominal data rate out from the FIFO as the first input and the internal pulse signal as the second input, the second adder having the required nominal data rate out from the FIFO and the internal pulse signal as inputs, the multiplexer having the output from the subtractor and the second adder as inputs and the Most Significant Bit of the fill level of the FIFO as selector, and the third adder having the output of the multiplexer and its own output, which defines said clock signal, looped back through the second flip-flops as inputs.

14. The system according to claim 8, wherein the physical size of the FIFOs are 64 bits.

15. The system according to claim 8, wherein said node is a switch.

* * * * *

UNITED STATES PATENT AND TRADEMARK OFFICE
CERTIFICATE OF CORRECTION

PATENT NO. : 7,372,862 B2  Page 1 of 1
APPLICATION NO. : 10/497858
DATED : May 13, 2008
INVENTOR(S) : Wego et al.

It is certified that error appears in the above-identified patent and that said Letters Patent is hereby corrected as shown below:

On the Title Page, in item (54), in Title, in Column 1, Line 1, delete "ADAPTION" and insert -- ADAPTATION --, therefor.

In Column 1, Line 1, delete "ADAPTION" and insert -- ADAPTATION --, therefor.

In Column 6, Line 33, delete " $10 \hat{6}$ " and insert -- 10^6 --, therefor.

In Column 6, Line 48, delete " $10 \hat{6}$ " and insert -- 10^6 --, therefor.

In Column 6, Line 57, delete "$10 \hat{6}$ " and insert -- 10^6 --, therefor.

In Column 7, Line 1, delete "c<=n+1" and insert -- c>=n+1 --, therefor.

In Column 7, Line 6, delete " $(2\hat{c})$ " and insert -- (2^c) --, therefor.

Signed and Sealed this

Sixth Day of January, 2009

JON W. DUDAS
*Director of the United States Patent and Trademark Office*